(12) United States Patent
Wilms et al.

(10) Patent No.: US 7,941,397 B2
(45) Date of Patent: May 10, 2011

(54) DYNAMICALLY CAPTURING DATA WAREHOUSE POPULATION ACTIVITIES FOR ANALYSIS, ARCHIVAL, AND MINING

(75) Inventors: Paul Fernand Wilms, San Jose, CA (US); Cheung-Yuk Wu, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 2026 days.

(21) Appl. No.: 10/785,108

(22) Filed: Feb. 25, 2004

(65) Prior Publication Data

US 2005/0187991 A1    Aug. 25, 2005

(51) Int. Cl.
*G06F 7/00* (2006.01)
*G06F 17/00* (2006.01)
(52) U.S. Cl. ......... 707/602; 707/640; 707/661; 707/736
(58) Field of Classification Search .................. 707/204, 707/203, 10, 1
See application file for complete search history.

(56) References Cited

U.S. PATENT DOCUMENTS

| | | | |
|---|---|---|---|
| 6,032,158 A * | 2/2000 | Mukhopadhyay et al. ........... 1/1 |
| 6,668,253 B1 * | 12/2003 | Thompson et al. ............. 707/10 |
| 7,031,987 B2 * | 4/2006 | Mukkamalla et al. ........ 707/204 |
| 7,043,497 B1 * | 5/2006 | Carty et al. ........................... 1/1 |
| 2002/0107957 A1 | 8/2002 | Zargham et al. .............. 709/224 |
| 2002/0143733 A1 * | 10/2002 | Mukkamalla et al. ............ 707/1 |
| 2002/0174000 A1 * | 11/2002 | Katz et al. ......................... 705/7 |
| 2002/0174093 A1 | 11/2002 | Casati et al. ..................... 707/1 |
| 2002/0178146 A1 | 11/2002 | Akella et al. ...................... 707/2 |
| 2003/0014335 A1 * | 1/2003 | Lecheler-Moore et al. .... 705/30 |
| 2003/0033179 A1 * | 2/2003 | Katz et al. .......................... 705/7 |
| 2003/0084142 A1 | 5/2003 | Casati et al. ................... 709/224 |
| 2003/0126152 A1 * | 7/2003 | Rajak ............................. 707/101 |
| 2003/0172091 A1 * | 9/2003 | Norcott .......................... 707/203 |
| 2003/0212654 A1 * | 11/2003 | Harper et al. ...................... 707/1 |

(Continued)

FOREIGN PATENT DOCUMENTS

WO    WO 01/33468 A1    5/2001

OTHER PUBLICATIONS

"Capturing Delays and Valid Times n Data Warehouses—Towards Timely Consistent Analyses," Bruckner et al., *Journal of Intelligent Information Systems*, 2002, pp. 169-190.

(Continued)

*Primary Examiner* — Usmaan Saeed
(74) *Attorney, Agent, or Firm* — IP Authority, LLC; Ramraj Soundararajan

(57) ABSTRACT

A system comprised of trigger mechanisms, a staging area, and an archived warehouse metadata table is used to extract, store, and archive extract, transform, and load (ETL) tasks from operational metadata in a data-warehousing environment. Operational metadata is comprised of ETL information; ETL task execution statuses, run number, definitions, control flow, and execution schedules. Specified ETL information is monitored and captured so that it may be extracted from operational metadata and transformed every time a trigger mechanism activates an update of stored data. Administrator-specified ETL task information is then stored in staging table. At specified intervals a staging table is refreshed with changes in operational data for each of the administrator-specified monitored and captured ETL tasks. Overwritten data, or outdated ETL task information, is then moved and stored in an archived warehouse metadata table. In one embodiment, archives are queried to generate reports analyzing the status of ETL tasks.

25 Claims, 6 Drawing Sheets

U.S. PATENT DOCUMENTS

| | | | | |
|---|---|---|---|---|
| 2003/0225798 | A1* | 12/2003 | Norcott | 707/203 |
| 2004/0024608 | A1* | 2/2004 | Saenz et al. | 705/1 |
| 2004/0068479 | A1* | 4/2004 | Wolfson et al. | 707/1 |
| 2004/0143496 | A1* | 7/2004 | Saenz | 705/14 |
| 2004/0215584 | A1* | 10/2004 | Yao | 706/12 |
| 2005/0228728 | A1* | 10/2005 | Stromquist | 705/30 |

OTHER PUBLICATIONS

"Inside Job," Michael Jennings, *Intelligent Enterprise Magazine*, Jul. 17, 2000, vol. 3, No. 12.

"Modeling and Executing the Data Warehouse Refreshment Process," Vavouras et al., Jan. 2000, Technical Report 2000.01, pp. 1-30.

"Optimizing the Data Warehousing Environment for Change: The Persistent Staging Area," Duncan et al., 1999.

"Striving Towards Near Real-Time Data Integration for Data Warehouses," Bruckner et al., *Proceedings of the Fourth International Conference on Data Warehousing and Knowledge Discovery (DaWaK 2002)*, 2002, pp. 317-326.

* cited by examiner

DYNAMICALLY CAPTURING DATA WAREHOUSE POPULATION ACTIVITIES FOR ANALYSIS, ARCHIVAL, AND MINING

BACKGROUND OF THE INVENTION

1. Field of Invention

The present invention relates generally to the field of database archival. More specifically, the present invention is related to an archiving method for extract, transform, and load tasks.

2. Discussion of Prior Art

As more and more daily business decisions and analyses require the use of large volumes of complex warehouse data, the time required for building warehouse data has grown exponentially. End users of a data-warehousing environment often need to complete a series of extract, transform, and load (ETL) tasks in one or more job streams within a limited time window on some periodic basis. An ETL task is defined by the manipulation of data; the extraction of data from a source, the insertion into a warehouse, or the modification of existing warehouse data. A job stream describes a set of related ETL tasks chained in a dependency tree structure. Each prerequisite task in a job stream must be completed successfully before subsequent dependent tasks can be started. If a prerequisite ETL task fails, certain actions must be immediately taken to ensure the continuation of the complete task flow, thus ensuring the execution of all subsequent, dependant ETL tasks. The continuation of task flow is necessary to ensure final warehouse data can be accurately built in a timely fashion. Capturing and managing these ETL task activities becomes vital to the delivery of current warehouse data for timely business decision-making. Being able to meet the service level commitment in building and refreshing warehouse data is crucial to the success of a business.

Data warehouse end users need a relatively large warehouse data availability time window for complex data analysis. Therefore, warehouse administrators and operators must monitor ETL tasks performed by end users closely to ensure that these tasks are completed successfully within a designated time window. Timely and successful completion of these tasks ensures that warehouse end users can access current warehouse data with low latency. To accomplish this, exception conditions must be corrected promptly so that a scheduled ETL task flow can resume without consuming a substantial amount of end users' data analysis time.

As the volume of complex business data volume continues to grow on a daily basis and data warehouse end users continue to demand larger availability windows to access warehouse data, the need arises for a monitoring system that can provide an efficient method of problem determination and future auditing with regards to ETL tasks. To accomplish efficient problem determination and to provide an audit trail, the history of ETL task execution statuses must be preserved. However, the status of ETL tasks in a typical data-warehousing environment may not be persistent since the execution status of an ETL task changes to indicate ETL task progress; only the final execution status of a completed ETL task is stored in operational warehouse metadata. Thus, it is necessary to store operational metadata that is frequently retrieved and updated, especially during the time of ETL task execution. When an ETL task terminates abnormally, it is necessary to have a record of all interim execution statuses for a given task prior to the failure for the purposes of problem determination and for future auditing. However, preservation of all interim execution statuses in operational warehouse metadata can potentially impact the performance of ETL tasks due to increased metadata volume. In addition, preserving all interim execution statuses creates an increase in the administrative load required to maintain and control warehouse metadata. To reduce latency for end users in a data-warehousing environment, normalized warehouse metadata must not be queried excessively while the data warehouse is online. Querying for ETL execution status, for example, reduces performance and poses the risk of misinterpreting or corrupting changing operational metadata.

In one approach, an archived warehouse metadata is used to capture and store the changes in operational warehouse metadata. This approach is limited in that archived warehouse metadata has the potential to grow without bound, thus furthering maintenance concerns. If archived warehouse metadata is "pruned" by data warehouse administrators as it grows, no audit trail records will remain for future reference. In addition, a trigger mechanism capturing the changes in operational warehouse metadata continuously providing changes to archived warehouse metadata may occur simultaneously with a data warehouse end user performing data analysis on the same archived warehouse metadata. Simultaneously accessing or operating on archived warehouse metadata can influence or even corrupt analyses.

Whatever the precise merits, features, and advantages of the above cited references, none of them achieves or fulfills the purposes of the present invention.

Thus, there is a need in the art for a dynamic method of data capture and storage of past and current statuses of ETL tasks that does not impact the performance of the existing data warehousing environment and access operations. A provision must be made for data warehouse administrators to control the time, frequency, and granularity at which changed operational warehouse metadata to be captured for analysis is stored and refreshed as well as for the capability of easily recovering damaged archived warehouse metadata. Also necessary in the art are methods for capturing ETL exception conditions and for generating error recoveries for handling exception conditions.

SUMMARY OF THE INVENTION

The system and method of the present invention utilizes operational metadata obtained from a data-warehousing environment to dynamically capture data warehouse population activities. Operational metadata containing ETL task definitions, control flow, execution schedules, and execution statuses obtained from a data warehouse is utilized by trigger mechanisms, staging tables, and an archived warehouse metadata table to store specified ETL task information. ETL information is extracted from operational metadata, filtered for specified ETL task data, transformed to a format necessary for storage in an ETL task staging table, and finally, archived in an archived warehouse metadata table.

An administrator of a data-warehousing environment specifies ETL information to monitor and capture. Thus, ETL task information is extracted from operational metadata and transformed when an update or delete trigger mechanism activates a change in operational metadata. Administrator-specified ETL task information is then stored in a staging table. At specified intervals, a staging table is refreshed with changes, or delta values, in operational data for each of the administrator-specified monitored and captured ETL tasks. Data that is overwritten, or outdated ETL task information, is then moved and stored in an archived warehouse metadata table.

In one embodiment, refresh operations on a staging table are scheduled by a system or user such that move operations performed by a delete trigger attached to a staging table occur at a pre-determined time or frequency. ETL task data in staging table is moved rather than copied to an archived warehouse metadata table thus ensuring each entry in a staging table is processed only once. An archived warehouse metadata table is periodically refreshed with changes in operational metadata that have been stored in a staging table. An archived warehouse metadata table is queried to report completed tasks, pending tasks, duration of step execution, error codes and messages, scheduling problems and changes, and any overdue ETL task run schedules or misses; for further mining and analysis, archived warehouse metadata table is backed up before its contents are filtered and stored into lower-level tables indicating ETL task errors, completed tasks, task temporary status, and task scheduled. Lower-level ETL task tables are queried to generate reports at a more granular level, thus allowing monitoring and analyses of administrator-specified ETL tasks.

DESCRIPTION OF THE PREFERRED EMBODIMENTS

Figure 1:
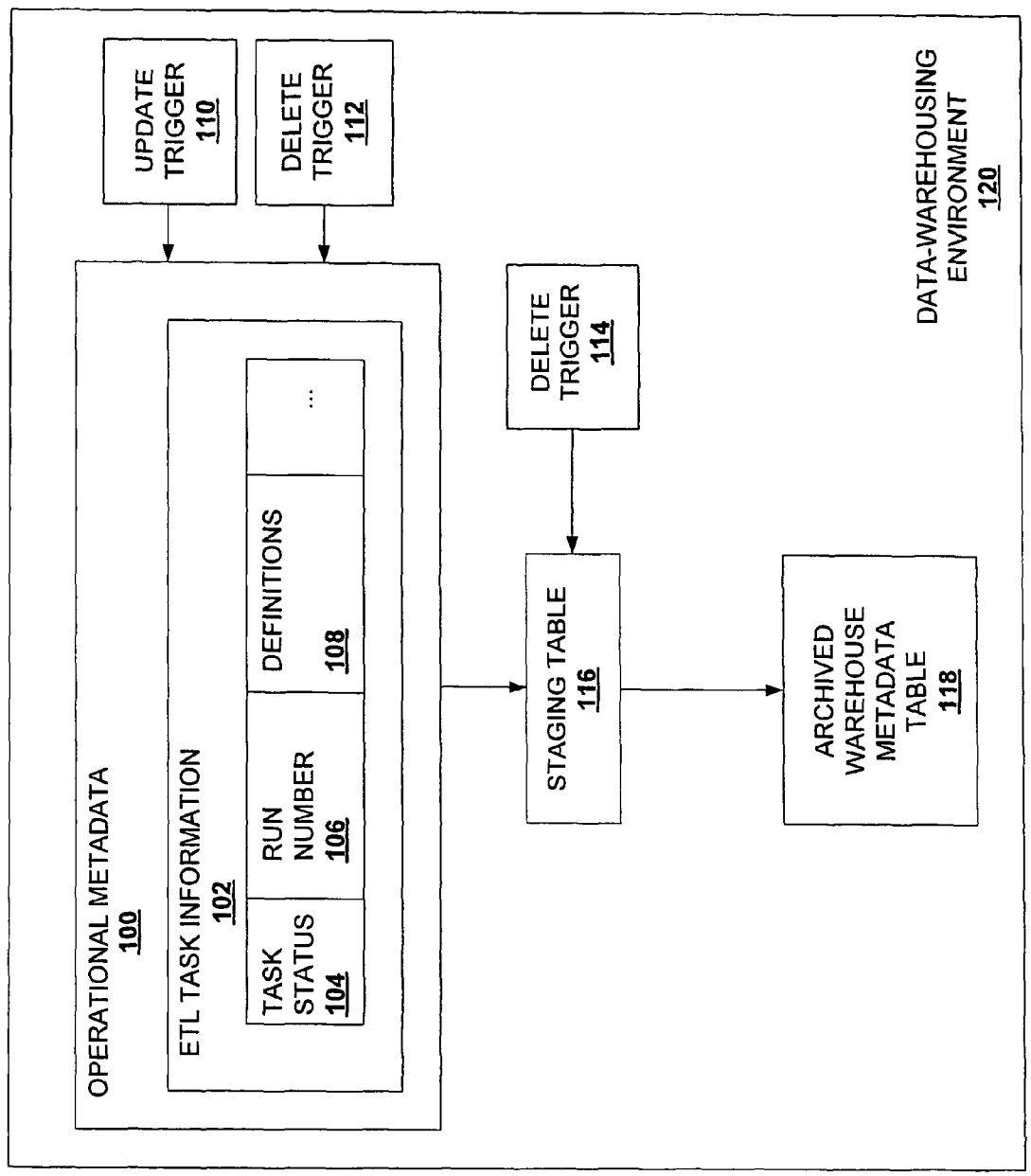
FIG. 1 illustrates a data-warehousing environment and associated data.

While this invention is illustrated and described in a preferred embodiment, the invention may be produced in many different configurations. There is depicted in the drawings, and will herein be described in detail, a preferred embodiment of the invention, with the understanding that the present disclosure is to be considered as an exemplification of the principles of the invention and the associated functional specifications for its construction and is not intended to limit the invention to the embodiment illustrated. Those skilled in the art will envision many other possible variations within the scope of the present invention.

FIG. 1 illustrates a general system diagram of the present invention comprised of operational metadata 100, trigger mechanisms 110, 112, 114, staging table 116, and archived warehouse metadata table 118 in data-warehousing environment 120. Operational metadata 100 is comprised of ETL information 102. ETL information 102 further comprises ETL task execution statuses 104, run number 106, definitions 108, control flow, and execution schedules. An administrator of data-warehousing environment 120 specifies ETL information 102 to monitor and capture. Subsequently, ETL task information 102 is extracted from operational metadata 100 and transformed when either of update trigger 110 or delete trigger 112 attached to operational metadata 100 are activated. Administrator-specified ETL task information 102 is then stored in staging table 116. Information in staging table 116 is refreshed with changes in operational metadata 100 for each of the administrator-specified monitored and captured ETL tasks by triggers 110 and 112. As a result of pruning of staging table 116, staging table delete trigger 114 is activated and archived warehouse metadata table 118 is refreshed. Archived warehouse metadata table 118 is static and is refreshed at specified time intervals in accordance with an administrator-specified pruning schedule. Pruning of staging table 116 and subsequent refreshing of archived warehouse metadata table 118 is performed in order to free buffer space in staging table 116 in a controlled manner.

Figure 2:
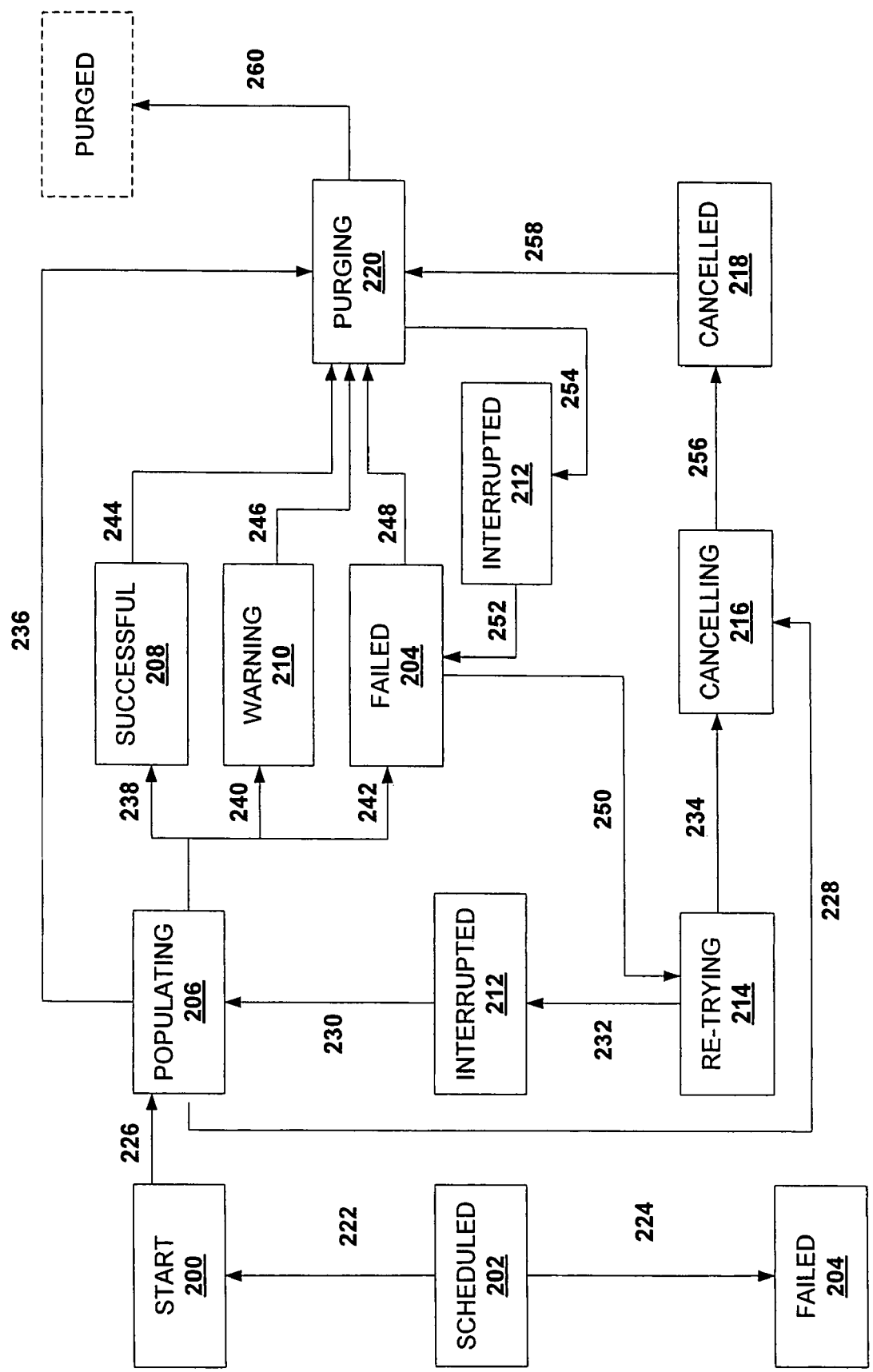
FIG. 2 is a state transition diagram between ETL task execution statuses.

To analyze the progress of a particular ETL task flow or job stream, an administrator of data-warehousing environment specifies ETL task status as information to be monitored and captured. Shown in FIG. 2 are states that an ETL task status can take on as it is being executed. Transitions between states are shown as occurring as a result of specified events, known as steps. Tracking of the current state of an ETL task during execution is necessary to determine if an ETL task has completed successfully and also determine whether error recovery measures must be deployed. Also shown in FIG. 2 is the order of change in execution statuses of an ETL task along with the volume and complexity of state transitions in a typical data-warehousing environment. Note that states 200-220 indicate the range of statuses an ETL task may take on, and transitions 222-260 indicate events necessary to move from a previous state to a subsequent state.

Since an ETL task may be run once or multiple times in each batch window or each processing cycle, data-warehousing environment must be able to uniquely identify execution statuses of each ETL task; a data-warehousing environment commonly assigns a unique number to represent the run edition of each ETL task. That is, if an ETL task is run twice, the first run is given one edition number and the second run of the same task is given another edition number. Edition numbers given to an ETL task are unique. This provision is of interest with regards to batch jobs run over a database. Furthermore, warehouse data generated by each run can be represented by a unique edition number to identify multiple versions of warehouse data in the same data warehouse.

Figure 3:
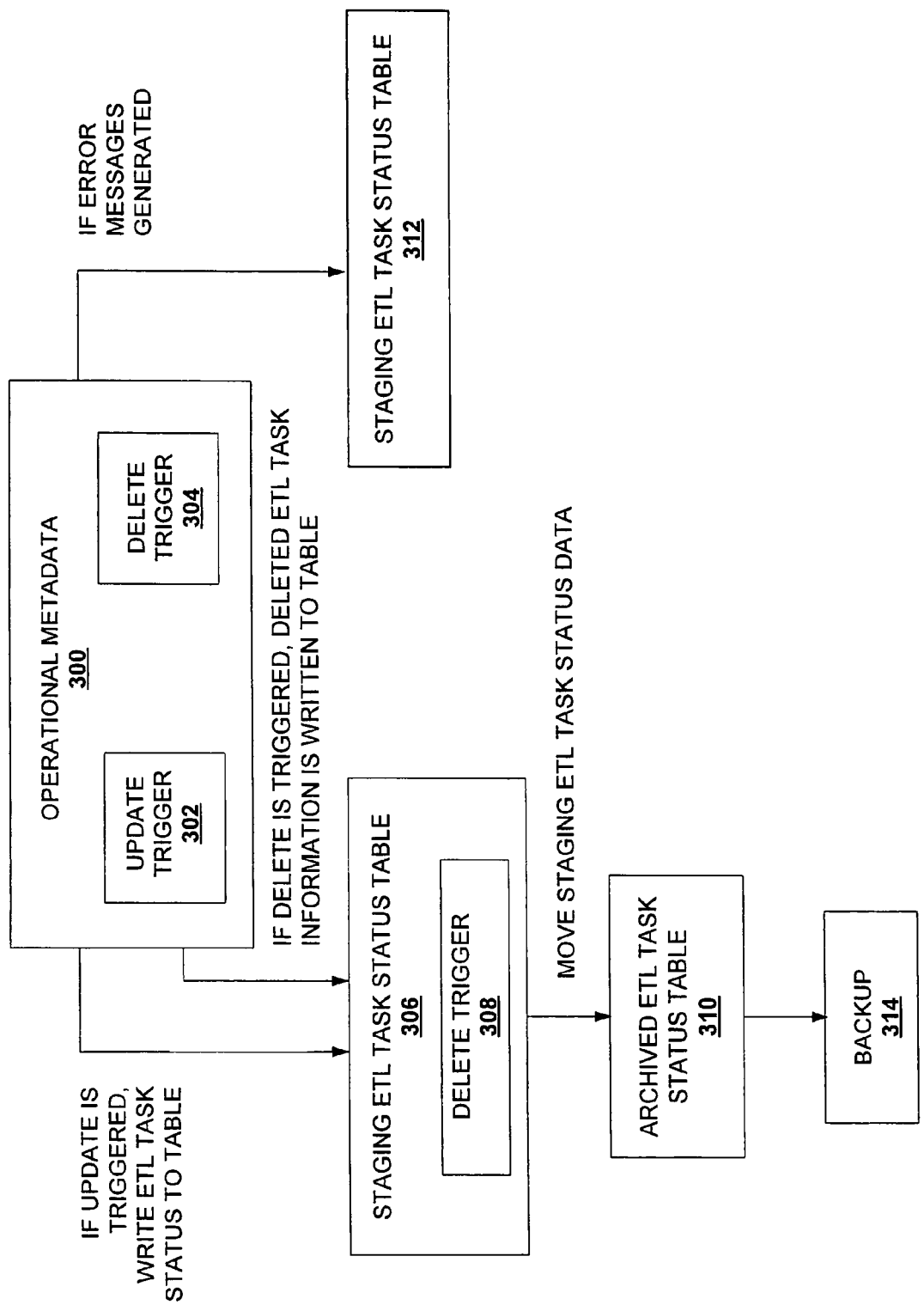
FIG. 3 is a process flow diagram of the method of the present invention.

Shown in FIG. 3 is operational metadata 300 containing information pertinent to a specified ETL task or tasks, along with associated triggers 302, 304. Update trigger 302 and delete trigger 304 attached to data-warehousing environment ensures continuous refreshing of archived metadata for analysis, processing, and auditing without impacting the performance of existing data warehouse processing operations. In an exemplary database management system, changes to warehouse data are logged before they are written to disk. Logged change data is used to initiate transaction rollbacks and recovery processes. A database trigger takes advantage of this built-in database mechanism without adding extensive overhead or impacting the performance.

Trigger mechanisms 302, 304 in data-warehousing environment 118 automatically detect and capture changes in the status of a specified ETL task. The attachment of update trigger 302 to operational metadata 300 automates the population of changes in ETL task information from operational metadata 300 to staging ETL task status table 306. The attachment of delete trigger 304 to operational metadata 300 automates the deletion of ETL task information from operational metadata 300 in the event an ETL task has been purged.

If update trigger 302 attached to operational metadata 300 extracts a completed status of failure or warning for a specified ETL task or tasks; error messages associated with the failure of specified ETL task or tasks are also extracted and transformed into a format necessary for storage in staging ETL task errors table 312. If update trigger extracts a completed ETL task (e.g., successful, warning, failed) from operational metadata 300; the status is extracted and transformed into a format necessary for storage in staging ETL task status table 306. If an ETL task is purged, delete trigger 302 attached to operational metadata 300 is activated, and purged ETL task information is written to staging ETL task status table 306. Staging ETL task status table 306 is managed by the activation of delete trigger 308, which is activated in accordance with an administrator-specified schedule. When delete trigger 308 is activated, then archived ETL task status 310 is emptied into a backup medium or media 314 or equivalent thereof, and data deleted from staging ETL task status table 306 is moved into emptied archived ETL task status table 310.

Prior to storage in archived ETL task status table 310, staging ETL task status table 306 buffers incoming changes in operational metadata 300. Because staging ETL task status table 306 stores with changes in operational metadata 300, periodic pruning is necessary. Periodic pruning of staging ETL task status table 306 ensures that its size does not grow without bound. Because archived ETL task status table 310 is static, it is backed up at administrator-specified periodic intervals so that it too does not grow without bound. Pruned data from staging ETL task status table 306 is then moved to archived ETL task status table 310 for analysis based on administrator-specified configurations. In one embodiment, staging ETL task status table 306 is initialized with operational metadata from data-warehousing environment 100 for selected ETL tasks. If staging ETL task status table 310 is not initialized, it starts as an empty table; otherwise, it stores current ETL task information delta values contained in operational metadata 300.

Figure 4:
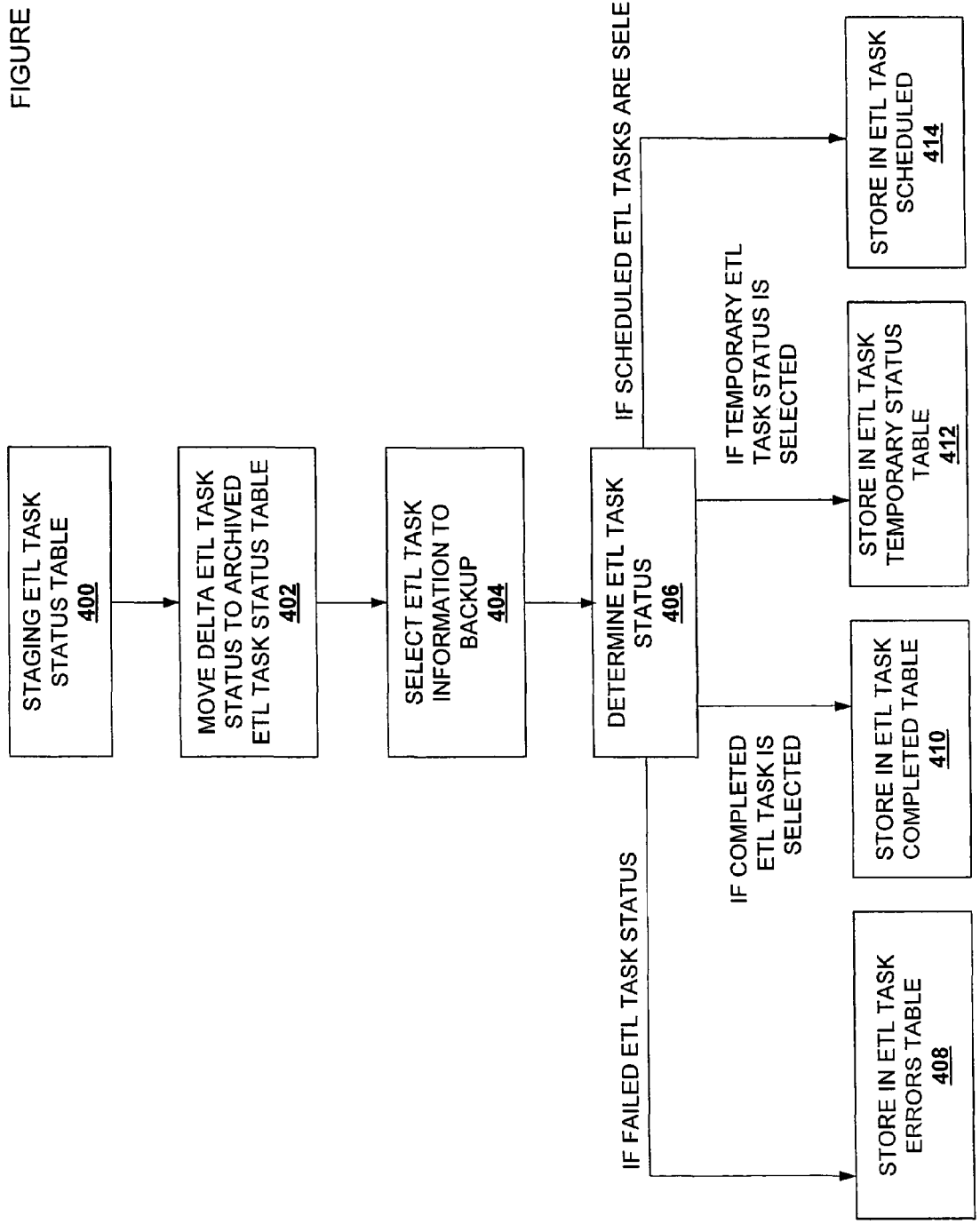
FIG. 4 is a process flow diagram for refreshing archives and backing up archived information.

Referring now to FIG. 4, delete trigger 308 is activated in staging ETL task status table 306 in step 400. In one embodiment, refresh operations on a staging ETL task status table 306 are scheduled such that move operations performed by delete trigger 308 occur at a pre-determined time or frequency. Archived ETL task status table 310 is initialized with a full copy of the operational metadata 300 for a selected ETL task or tasks. A full copy of operational metadata 300 is selected and captured in order to establish a baseline for past data warehouse population activities. In step 402, information in staging ETL task status table 306 is moved rather than copied to archived ETL task status table 310 to ensure that each entry in staging ETL task status table 306 is processed only once. Specified ETL task information is selected from archived ETL task status table 310 for backup, in step 404. Also in step 404, selected ETL task information from archived ETL task status table 310 is then backed up onto disk, optical media, etc. In step 406, ETL task status for selected ETL task information is determined. If the status determined in step 406 is that of failure, then ETL task errors are stored in ETL task error table in step 408.

If it is determined in step 406 that ETL task status is not that of failure, then it is determined whether completed ETL task status, temporary ETL task status, or scheduled ETL tasks has or have been selected from archived ETL task status table 310. In steps 410, 412, and 414, selected ETL task information is extracted from archived ETL task status table 310 and stored in a corresponding ETL task table.

A system administrator or user of data-warehousing environment 118 configures the transfer of information between a staging area and an archive. In one embodiment, the granularity of data moved from staging ETL task table 306 to archived ETL task status table 310 is variable. For example, upon completion of a batch job or when problem determination is required, all ETL task information pertaining to the batch job or problem is moved together from a staging area to an archive, as opposed to separately. In another embodiment, a system administrator or user of data-warehousing environment 118 backup archived ETL task status table 310 based on the timestamp of the most recently captured entry to a file or an external storage device for future auditing.

Figure 5:
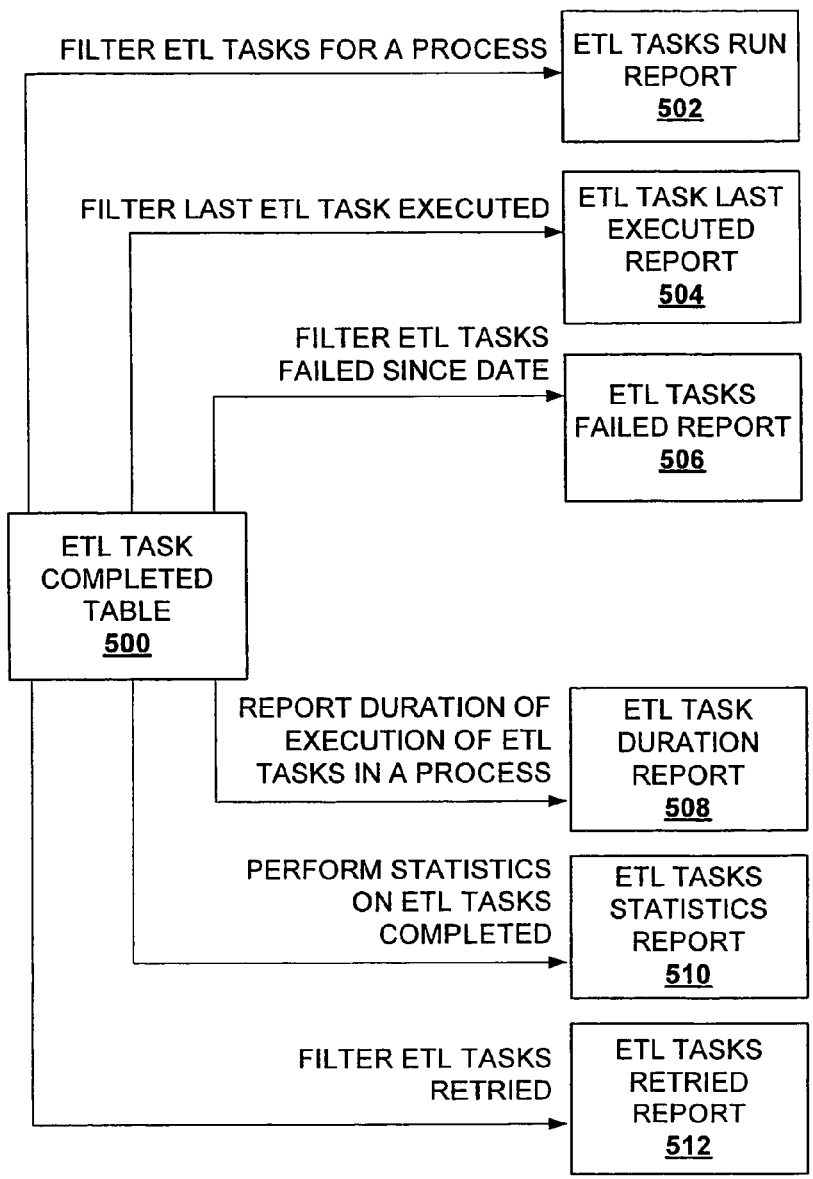
FIG. 5 illustrates reports generated from ETL task complete table.

Archived ETL task status table 310 is also queried to report completed tasks, pending tasks, duration of step execution, error codes and messages, scheduling problems and changes, and any overdue ETL task run schedules or misses after being refreshed with data from staging ETL task status table 306. Referring now to FIG. 5, ETL task completed table 500 is further queried to generate reports indicating the sequence of ETL tasks executed in a process 502, last ETL task executed 504, ETL task or tasks failed 506, duration of execution of ETL tasks in process 508, statistics associated with an ETL task run or runs 510, and ETL task or tasks retried 512. This provision is of interest because a completed task may be specified by a warning or failure status, in addition to a successful status. A completed ETL task specified by a warning or failure status requires the analysis of interim task execution statuses and associated ETL task information.

Figure 6:
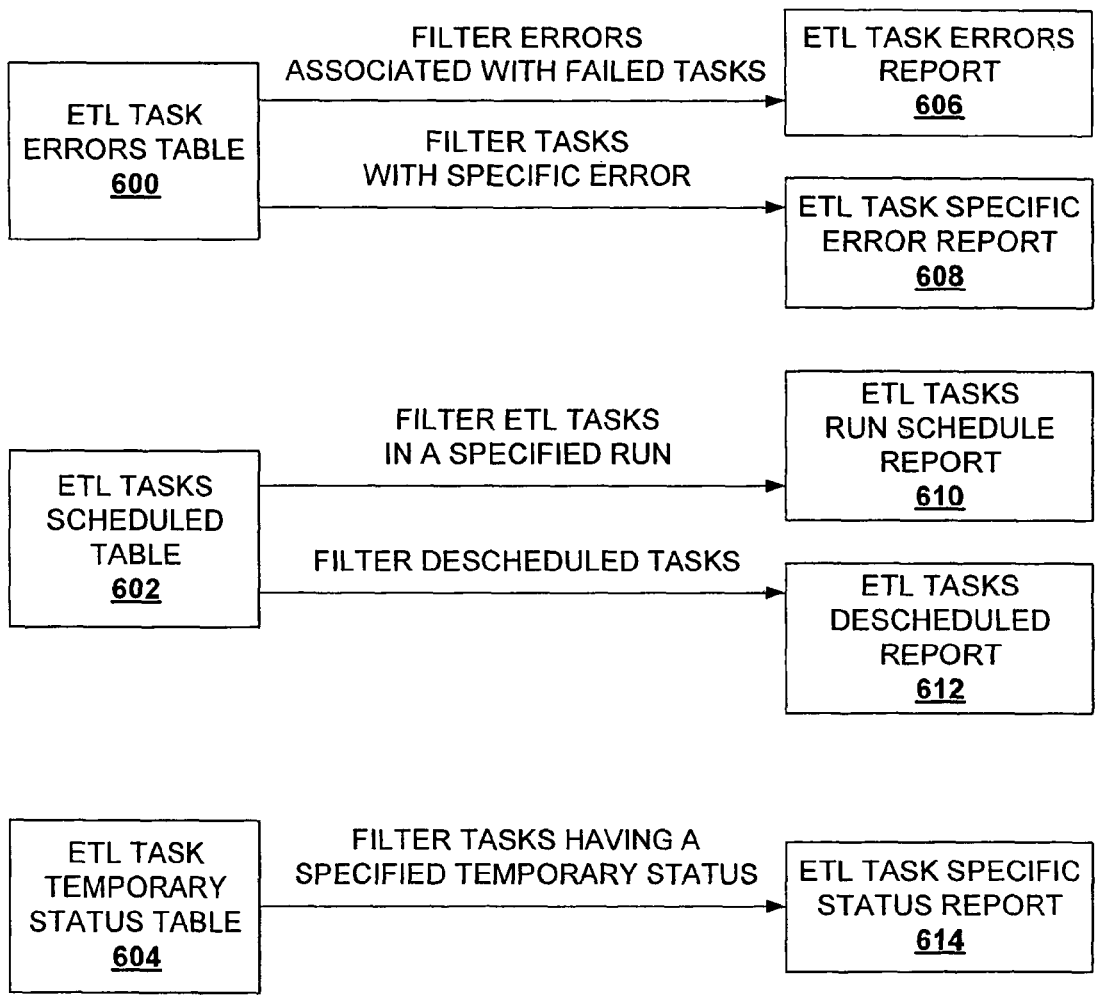
FIG. 6 illustrates reports generated from ETL task errors table, ETL tasks scheduled table, and ETL task temporary status table.

Shown in FIG. 6, are reports generated from ETL task errors table 600, ETL tasks scheduled table 602, and ETL task temporary status table 604. Generated from ETL task errors table 600 are reports indicating errors associated with ETL tasks having a failed status 606 as well as ETL task IDs corresponding to those tasks finishing with a specific error 608. Generated from ETL task scheduled table 602 are reports indicating the sequence of ETL task IDs executed in a process 610 as well as de-scheduled ETL tasks 612. Generated from ETL task temporary status table 604 are reports indicating ETL task IDs having a specific temporary status at a specified point in time 614.

If archived ETL task status table is queried directly, additional reports to aid in monitoring and auditing ETL tasks are generated. Examples of queries that are performed against the accumulated ETL task execution statuses in archived warehouse metadata which is not easily, if at all, discernable from a query of operational metadata comprise: ETL task steps failed since a specified date, steps failed during last ETL task execution, errors associated with failed steps, steps completed with a specified return code, suggested action or actions to resolve unsuccessful ETL task execution, reasons behind the inability of a step to execute at a specified time, length of time necessary for a step to complete each run, statistics relevant to the execution of steps in a specific ETL task, steps requiring a retry and number of retries necessary to achieve status at completion, de-scheduled, re-scheduled, and overwritten steps, steps having a specified status (e.g., purged, canceled, removed) at any point in time, and reasons for the inability of a step to be cascaded in a defined job stream.

In another embodiment, recovery actions are customized and run for known error conditions. An administrator of data-warehousing environment is alerted to follow previously customized recovery and retry actions for failed tasks generating known errors and warnings. For example, if an ETL task attempting to connect to a database fails in its execution because of a login password changed by a system administrator, an administrator follows a previously customized procedure to update the login password and rerun the failed ETL task. For new errors and warnings, an administrator of data-warehousing environment is paged to respond to exception conditions by utilizing historical execution statuses. Archived warehouse metadata is pruned and saved by warehouse administrators at configured intervals along with a current timestamp to associate with a backup copy; a warehouse administrator can easily identify the most recent tasks recorded in the backup for future restoration.

Additionally, the present invention provides for an article of manufacture comprising computer readable program code contained within implementing one or more modules to monitor task execution statuses during data warehouse population. Furthermore, the present invention includes a computer program code-based product, which is a storage medium having program code stored therein which can be used to instruct a computer to perform any of the methods associated with the present invention. The computer storage medium includes any of, but is not limited to, the following: CD-ROM, DVD, magnetic tape, optical disc, hard drive, floppy disk, ferroelectric memory, flash memory, ferromagnetic memory, optical storage, charge coupled devices, magnetic or optical cards, smart cards, EEPROM, EPROM, RAM, ROM, DRAM, SRAM, SDRAM, or any other appropriate static or dynamic memory or data storage devices.

Implemented in computer program code based products are software modules for: (a) tracking the state of a single or multiple ETL tasks as they are run; (b) uniquely identifying the execution status of each singly or multiply executed ETL task; (c) dynamically capturing data warehouse population activities; (d) archiving interim and final ETL task information; and (e) generating and reporting ETL task-relevant information.

CONCLUSION

A system and method has been shown in the above embodiments for the effective implementation of the dynamic capture of data warehouse population activities for analysis, archival, and datamining. While various preferred embodiments have been shown and described, it will be understood that there is no intent to limit the invention by such disclosure, but rather, it is intended to cover all modifications falling within the spirit and scope of the invention, as defined in the appended claims. For example, the present invention should not be limited by software/program or computing environment.

The above enhancements are implemented in various computing environments. For example, the present invention may be implemented on a conventional IBM PC or equivalent. All programming and data related thereto are stored in computer memory, static or dynamic, and may be retrieved by the user in any of: conventional computer storage, display (i.e., CRT) and/or hardcopy (i.e., printed) formats. The programming of the present invention may be implemented by one of skill in the art of database programming.

The invention claimed is:

1. A method for capturing and recording task information obtained from a data-warehousing environment for analysis, archival, and mining comprising steps of:
   a. uniquely identifying each task within a run,
   b. selecting one or more of said uniquely identified tasks to monitor,
   c. capturing data-warehousing population activities dynamically by
      i. obtaining operational metadata containing task information relevant to said selected task or tasks,
      ii. calculating changes in operational metadata,
      iii. storing results of said calculating step in a buffer, and moving selected buffer data to an archive, said archive used in data analysis and mining.

2. The method of claim 1, wherein said task is an extract, transform, load (ETL) task.

3. The method of claim 1, wherein said buffer is a staging table.

4. The method of claim 1, wherein either one of a system or a user performs said selecting step.

5. The method of claim 1, wherein said operational metadata and changes in operational metadata are obtained via a trigger mechanism.

6. The method of claim 5, wherein said trigger mechanism is attached to said operational metadata and to said buffer.

7. The method of claim 5, wherein said trigger mechanism attached to operational metadata is activated by either changes to said selected task in said operational metadata or by termination of said selected task.

8. The method of claim 6, whereupon termination of said selected task; said task status information is extracted from said operational metadata, if said selected task terminates with a failure or warning status, then error messages associated with said selected task or tasks are also extracted from said operational metadata, and said extracted task information is transformed into a format necessary for storage in said buffer.

9. The method of claim 8, wherein upon termination of said selected task:
   a. said trigger mechanism attached to said operational metadata is activated,
   b. said buffer is refreshed with changes in said operational metadata before said trigger mechanism was activated,
   c. said archive is emptied into a backup medium or media, and said buffer data relevant to said selected task is moved from said buffer to said archive.

10. The method of claim 9, wherein the granularity of data moved from said buffer to said archive is variable.

11. The method of claim 9, wherein refresh operations on said buffer occur in response to the activation of said trigger mechanisms attached to said operational metadata.

12. The method of claim 9, wherein said archive is queried to report any of: completed tasks, pending tasks, duration of execution, error codes and message, scheduling problems, scheduling changes, and overdue task runs, and overdue task misses.

13. The method of claim 9, wherein said backup step comprises: selecting archive data to backup, backing up said selected archive data, extracting said selected archive data from said archive, filtering said selected archive data from said archive, and moving to a table said filtered archive data.

14. The method of claim 9 wherein said archive is backed up at configured intervals.

15. The method of claim 9, wherein said buffer data to be backed up is associated with a current timestamp.

16. The method of claim 15, wherein said current timestamp is utilized in backup restoration.

17. The method of claim 13, wherein said tables indicate any of: tasks completed, task errors, task temporary statuses, and tasks scheduled.

18. The method of claim 17, wherein said tables are queried to generate reports comprising any of: sequence of tasks executed in a process, last task executed, task or tasks failed, duration of execution of tasks in a process, task or tasks retried, and statistics associated with a task run or runs, errors associated with failed tasks, tasks failing with a specified error, task run schedule, de-scheduled tasks, and tasks having a specified temporary status.

19. An article of manufacture comprising a computer storage medium having computer readable program code embodied therein which implements a method for capturing and recording task information obtained from a data-warehousing environment for analysis, archival, and mining, said medium comprising computer readable program code to execute the steps of:
 a. uniquely identifying each task within a run,
 b. selecting one or more of said uniquely identified tasks to monitor;
 c. capturing data-warehousing population activities dynamically by
  i. obtaining operational metadata containing task information relevant to said selected task or tasks,
  ii. calculating changes in operational metadata from said data-warehousing environment,
  iii. storing results of said calculated step in a buffer, and
  iv. moving selected buffer data to an archive, said archive used in data analysis and mining.

20. The article of manufacture of claim 19, wherein said task is an extract, transform, load (ETL) task.

21. The article of manufacture of claim 19, wherein said buffer is a staging table.

22. The article of manufacture of claim 19, wherein said medium further comprises computer readable program code obtaining changes in operational metadata via a trigger mechanism.

23. The article of manufacture of claim 22, wherein said trigger mechanism is attached to said operational metadata and to said buffer.

24. The article of manufacture of claim 22, wherein said trigger mechanism attached to operational metadata is activated by either changes to said selected task in said operational metadata or by termination of said selected task.

25. The article of manufacture of claim 24, whereupon termination of said selected task; said task status information is extracted from said operational metadata, if said selected task terminates with a failure or warning status, then error messages associated with said selected task or tasks are also extracted from said operational metadata, and said extracted task information is transformed into a format necessary for storage in said buffer.

* * * * *